UNITED STATES PATENT OFFICE.

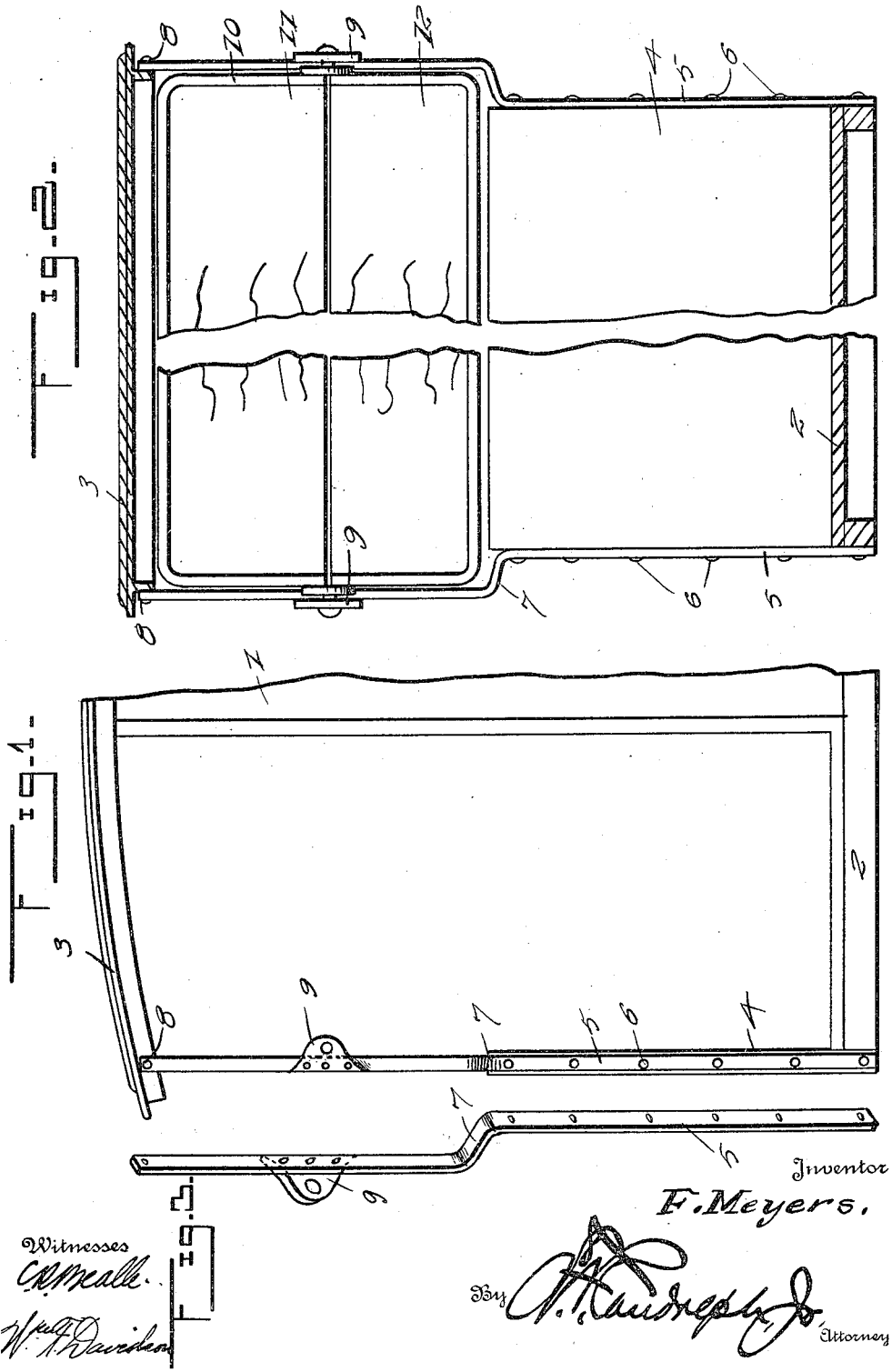

FREDERICK MEYERS, OF BEARDSLEY PARK, CONNECTICUT.

WIND-SHIELD HOLDER.

1,305,919.    Specification of Letters Patent.    Patented June 3, 1919.

Application filed March 23, 1917. Serial No. 157,045.

*To all whom it may concern:*

Be it known that I, FREDERICK MEYERS, a citizen of the United States, residing at Beardsley Park, in the county of Fairfield and State of Connecticut, have invented certain new and useful Improvements in Wind-Shield Holders; and I do hereby declare the following to be a full, clear, and exact description of the invention, such as will enable others skilled in the art to which it appertains to make and use the same.

This invention relates to wind shield holders and has for one of its objects the provision of a device of this character, whereby an ordinary wind shield may be connected thereto and which will prevent movement of the windshield with relation to the automobile body, thus obviating the danger of the glass of the wind shield becoming broken, and obviating undue noise caused by rattling parts.

Another object of this invention is the provision of a pair of braces secured to each side of the dash of an automobile and secured to the top and having means for connecting a wind shield thereto, thus providing an efficient support for the windshield and also a brace connection between the top of the automobile and the dash thereof.

Another object of this invention is the provision of ears secured to the braces and adapted to have the wind shield pivoted thereto, whereby the wind shield is connected to the braces and which may be folded and unfolded when desired in the usual manner.

A further object of this invention is the provision of a wind shield holder of the above stated character, which shall be simple, durable and efficient, and which may be manufactured and sold at a comparatively low cost.

With these and other objects in view as will become more apparent as the description proceeds, the invention consists of certain novel features of construction, combination and arrangement of parts as will be hereinafter more fully described and claimed.

For a complete understanding of my invention, reference is to be had to the following description and accompanying drawing, in which:

Figure 1 is a fragmentary side elevation of an automobile body of the commercial type having my invention applied thereto, Fig. 2 is a transverse sectional view of the same, Fig. 3 is a perspective view of one of the braces.

Referring in detail to the drawing, the numeral 1 indicates as an entirety, a commercial body frame of an automobile having the usual floor 2 and top 3. The flooring 2 has connected thereto, the front dash 4.

A pair of braces 5 are secured upon each edge of the dash 4 by fasteners 6, and are offset outwardly and upwardly as at 7 and have their upper ends connected to the top 3, as at 8.

Secured to the upper portions of the braces are ears 9 to which are pivoted the ordinary type of wind shield 10 consisting of upper and lower sections 11 and 12. The offset portions of the braces 5 are adapted to accommodate the lower section 12 of the wind shield 10, as shown in Fig. 2.

From the foregoing description taken in connection with the accompanying drawing, it will be noted that braces have been provided which may be readily attached to the commercial body of an automobile and whereby the top 3 will be braced and supported by the dash 4 and also which is capable of supporting the ordinary wind shield which will permit the same to be folded and unfolded when desired. The foregoing description relates to a construction of braces which may be readily applied to any ordinary type of commercial body employing a top and dash and whereby the ordinary type of wind shield may be applied, thus providing a construction wherein the various parts are efficiently braced, preventing undue noise caused by the rattling of various parts, which are not substantially supported.

While I have shown and described the preferred embodiment of my invention, it will be understood that minor changes in construction, combination and arrangement of parts may be made without departing from the spirit and scope of the invention as claimed.

Having thus described my invention, what I claim is:

The combination with an automobile including a body frame, a dash and a top, of a pair of braces having their lower ends secured to the body frame and to each edge of the dash and extending throughout the entire height thereof for reinforcing the dash and firmly securing the same to the body frame, said braces being offset outwardly and upwardly at the upper edge of the dash, said braces having their upper ends connected to the top for supporting said top to the dash, and ears secured to the outer faces of the braces and disposed laterally thereto for supporting a wind shield between the offset portions and the upper ends of the braces.

In testimony whereof I affix my signature in presence of two witnesses.

FREDERICK MEYERS.

Witnesses:
F. S. DAVIS,
R. M. DAVIS.

Copies of this patent may be obtained for five cents each, by addressing the "Commissioner of Patents, Washington, D. C."